B. F. McGUINESS.
PICK FINDER MECHANISM FOR LOOMS.
APPLICATION FILED JUNE 8, 1905.

913,301.

Patented Feb. 23, 1909.
6 SHEETS—SHEET 1.

B. F. McGUINESS.
PICK FINDER MECHANISM FOR LOOMS.
APPLICATION FILED JUNE 8, 1905.

913,301.

Patented Feb. 23, 1909.
6 SHEETS—SHEET 3.

Fig. 4.

Witnesses
M. Bredt.
M. Haas.

Inventor
Benj. F. McGuiness
By John C. Dewey
Attorney.

B. F. McGUINESS.
PICK FINDER MECHANISM FOR LOOMS.
APPLICATION FILED JUNE 8, 1905.

913,301.

Patented Feb. 23, 1909.
6 SHEETS—SHEET 4.

B. F. McGUINESS.
PICK FINDER MECHANISM FOR LOOMS.
APPLICATION FILED JUNE 8, 1905.

913,301.

Patented Feb. 23, 1909.
6 SHEETS—SHEET 5.

Witnesses
M. Bredt
M. Head

Inventor
Benj. F. McGuiness
By John C. Dewey
Attorney.

B. F. McGUINESS.
PICK FINDER MECHANISM FOR LOOMS.
APPLICATION FILED JUNE 8, 1905.

913,301.

Patented Feb. 23, 1909.
6 SHEETS—SHEET 6.

UNITED STATES PATENT OFFICE.

BENJAMIN F. McGUINESS, OF WORCESTER, MASSACHUSETTS, ASSIGNOR TO CROMPTON & KNOWLES LOOM WORKS, A CORPORATION OF MASSACHUSETTS.

PICK-FINDER MECHANISM FOR LOOMS.

No. 913,301.     Specification of Letters Patent.     Patented Feb. 23, 1909.

Application filed June 8, 1905. Serial No. 264,224.

*To all whom it may concern:*

Be it known that I, BENJAMIN F. Mc-GUINESS, a citizen of the United States, residing at Worcester, in the county of Worcester and State of Massachusetts, have invented certain new and useful Improvements in Pick-Finder Mechanism for Looms, of which the following is a specification.

My invention relates to looms, and more particularly to a pick finder mechanism for looms, and particularly to the class of looms in which the movement of the harness is controlled by a fancy head, or dobby, through a pattern chain or surface, in the well known way.

The object of my invention is to provide an improved pick finder mechanism of simple construction and operation, and adapted to be applied to any loom of the class referred to, and to be used in finding the pick, after the breakage or exhaustion of the filling.

The customary and well known way of finding a pick on a fancy head, or dobby loom, after the breaking or exhaustion of filling is as follows:—When the filling breaks or runs out the filling stop motion acts to throw off the shipper handle and stop the loom in the well known way. It generally happens that the momentum of the loom causes one or more picks of the shuttle without any filling, and it is necessary, in order to find the open shed at the point where the filling broke or ran out, for the weaver to leave the shipper handle of the loom, and go to the dobby to turn back the pattern chain; after doing this the weaver must throw back the pawl on the ratchet take-up gear, remove the shuttle, and hold the shuttle binder out with his hand, so that the protection dagger will clear the bunter while the proper shed is being found. After replacing the shuttle in its proper box the weaver has to let back the cloth, by releasing the hold-fast pawl on the take-up, and also raise the friction weights on the warp beams, bring the lay up to the front of the loom, and turn the take-up gear until the warp has the proper tension again. The lay will now be pushed back to a point where the loom can be started without fear of "banging off," and the weaving can be proceeded with until the next breakage or exhaustion of filling. It often happens that in picking the loom over without a shuttle, the weaver lets go of the shuttle binder before the end of the protection dagger has reached the bunter. The result of this is that the dagger strikes the bunter and the loom "bangs off."

It is obvious that the method of finding the pick above described is slow and complicated, and entails unnecessary wear and tear on the loom. With my improvements it is possible to find the pick without leaving the shipper handle, and without touching the take-up, and without any wear and tear on the loom.

In my improvements, I provide, preferably close beside the regular shipper handle, an auxiliary handle, or lever, preferably so constructed and located that it may be pulled on by the weaver, either separately, or by the same movement which pulls on the regular shipper handle. My auxiliary handle is connected with the ordinary filling stop motion, so that on the breaking or failure of the filling said auxiliary handle and the regular handle are thrown off at the same time. The throwing off of the regular handle stops the loom, and the throwing off of the auxiliary handle, connected with the pick mechanism, the reverse mechanism of the pattern chain mechanism, and the take-up mechanism, operates automatically to move the picking shoes from under the picking rolls, to move the sliding clutch of the pattern chain mechanism, and to lift the pawl on the ratchet on the take-up gear. After this operation, in order that the weaver may find the pick, it is only necessary to pull on the regular handle, and run the loom pick by pick until the proper shed is found. It is unnecessary to remove the shuttle, because the picking shoes have been moved out of the path of the picking balls, and the loom will not pick. It is unnecessary to turn back the pattern chain, because the movement of the clutch of the pattern chain mechanism causes the pattern chain to run backward, and the rungs on the indicator fingers are preferably made of such a shape that the proper harnesses will always be called instantly when the loom is stopped by the breaking of the filling, and when the loom is started up again after finding the pick. It is unnecessary to throw back the pawl on the take-up, because the pawl is lifted automatically when the loom stops. After the lost pick has been found the loom may be started up at once by pulling on both handles, the regular handle, and the auxiliary handle. I have also adapted my improvements to be applied to a loom having drop shuttle boxes, either at one or both ends. In this class of looms it is necessary to reverse the box pattern chain, and the multiplier pattern chain, and to accomplish this I provide the indicator levers on the box pattern chain and multiplier pattern chain, with sliding runs which are controlled by the same mechanism which reverses the pattern chain mechanisms. By means of the sliding runs on the indicator levers, I prevent the loss of a pick, as will be hereinafter fully described.

In case anything should catch in the gears which drive the pattern chain mechanisms, I provide a give-way spring on the shaft beneath the dobby. This will prevent slipping of gears and will render it unnecessary to time the pattern chain over again. When the loom is started up after picking out, and the picking ball being down prevents the picking shoe from moving back into its place at once, I provide a spring, so that the auxiliary handle may be pulled on at the proper point, and the picking shoe will move into its place as soon as the picking ball is moved out of the way. By a similar arrangement the sliding clutch of the pattern chain mechanism also moves in at the proper point. It is impossible for the clutch to catch in both gears at the wrong time, on account of the cam shape of the engaging surfaces of the clutch members, which cause the clutch to be pushed away from one gear and into the other gear. On the middle of the sliding clutch is an annular ridge, which has an extension at one point, which will extend on one side or the other of a stationary pin, if the auxiliary handle is pulled on in the wrong place, and prevent the clutch from changing from one gear to the other at the wrong time.

I have only shown in the drawings detached parts of a loom having my improvements applied thereto, sufficient to enable those skilled in the art to understand the construction and operation thereof. The parts of the loom shown in the drawings with which my improvements are combined are of well known construction and operation, and therefore do not require to be fully described herein.

Referring to the drawings:
Fig. 3 is a cross section through parts of a loom, showing the opposite end of the loom from that shown in Fig. 1, and showing the dobby driving mechanism, the pick mechanism, and the take-up mechanism.
Figs. 5 to 10 are shown on an enlarged scale.

In the accompanying drawings, 1 are the loom sides, 2 the lay-swords pivotally mounted at their lower ends, 3 the lay-beam, connected through crank connectors 4 with the crank shaft 5. Only one crank connector 4 is shown.

6 is the breast-beam, 7 is the bottom shaft having the picking arms 8 fast thereon, at opposite ends of the shaft; and carrying the picking balls 9, adapted to engage the picking shoes 10, fast on the picking shafts 11.

Figure 3:
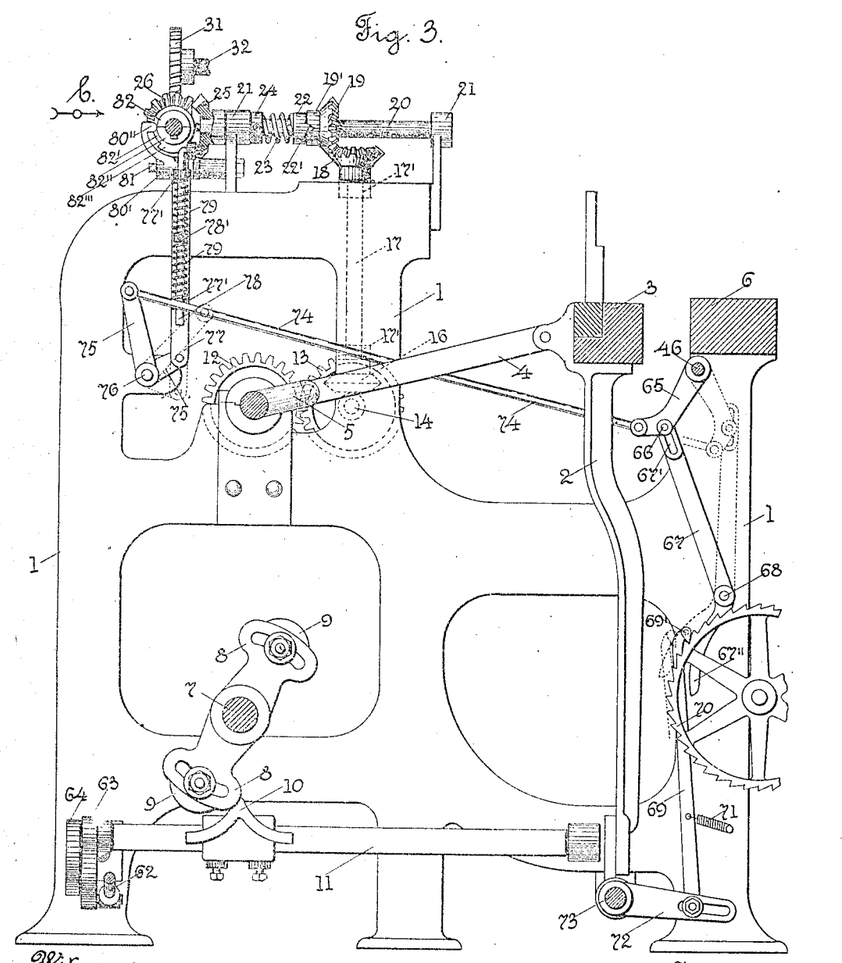

On the crank shaft 5 is fast a gear 12 which meshes with and drives a gear 13, mounted on a stud 14, see Fig. 3. Revolving with the gear 13 is a bevel gear 15, see Fig. 4, which meshes with and drives a bevel gear 16, fast on the lower end of an upright shaft 17, mounted in suitable bearings 17'. On the upper end of the upright shaft 17 is a bevel gear 18, which meshes with and drives a bevel gear 19 on the horizontal shaft 20, mounted in suitable bearings 21, see Fig. 3.
The bevel gear 19 is yieldingly secured to the shaft 20, in this instance, by a spring actuated clutch device, see Fig. 3, comprising a collar 22 having a projection 22' thereon, to enter a recess in the hub 19' of the bevel gear 19, and a spring 23, extending between a collar 24 fast on the shaft 20, and the clutch collar 22. By means of the clutch attachment of the bevel gear 19 to the shaft 20, the gear 19 can be turned without turning the shaft 20. The shaft 20 has on its inner end a bevel gear 25, which meshes with two bevel gears 26 and 27, see Fig. 4, both loose on a shaft 28, mounted in suitable bearings 29, and carrying a worm 30, adapted to mesh with and drive the worm gear 31, on the shaft 32 of the dobby pattern chain cylinder 33, see Figs. 4 and 5.

Figure 4:
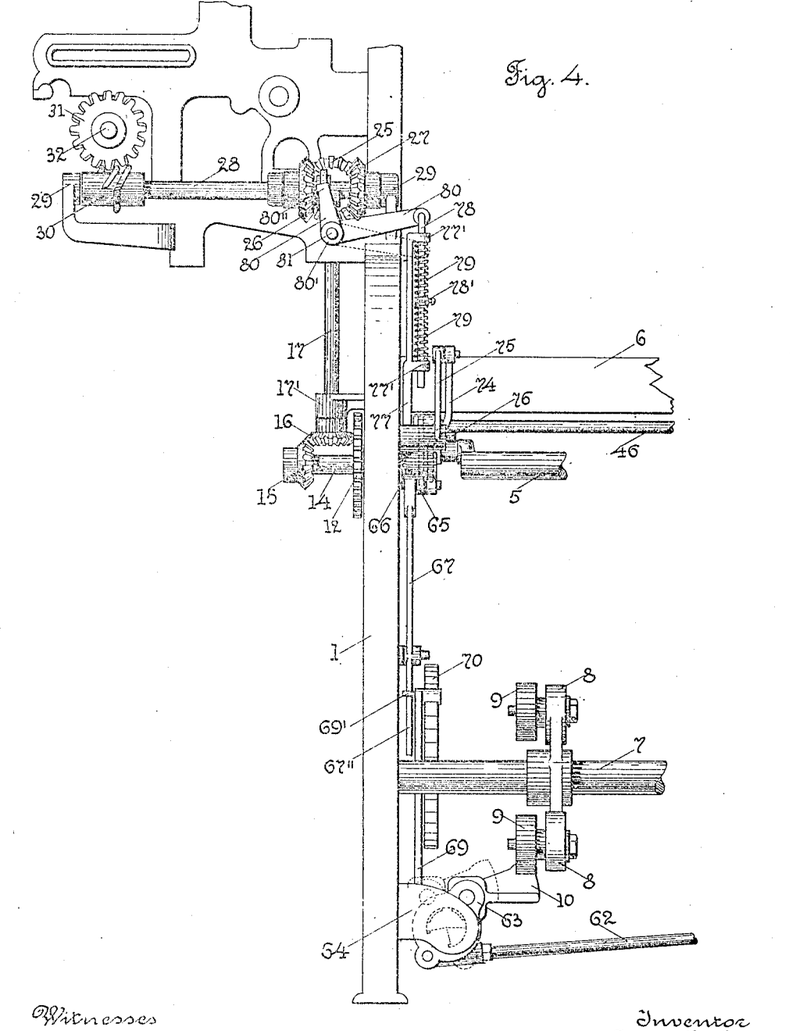
Fig. 4 is a rear view of the parts shown in Fig. 3, looking in the direction of arrow $b$, same figure.
Figures 5, 6:
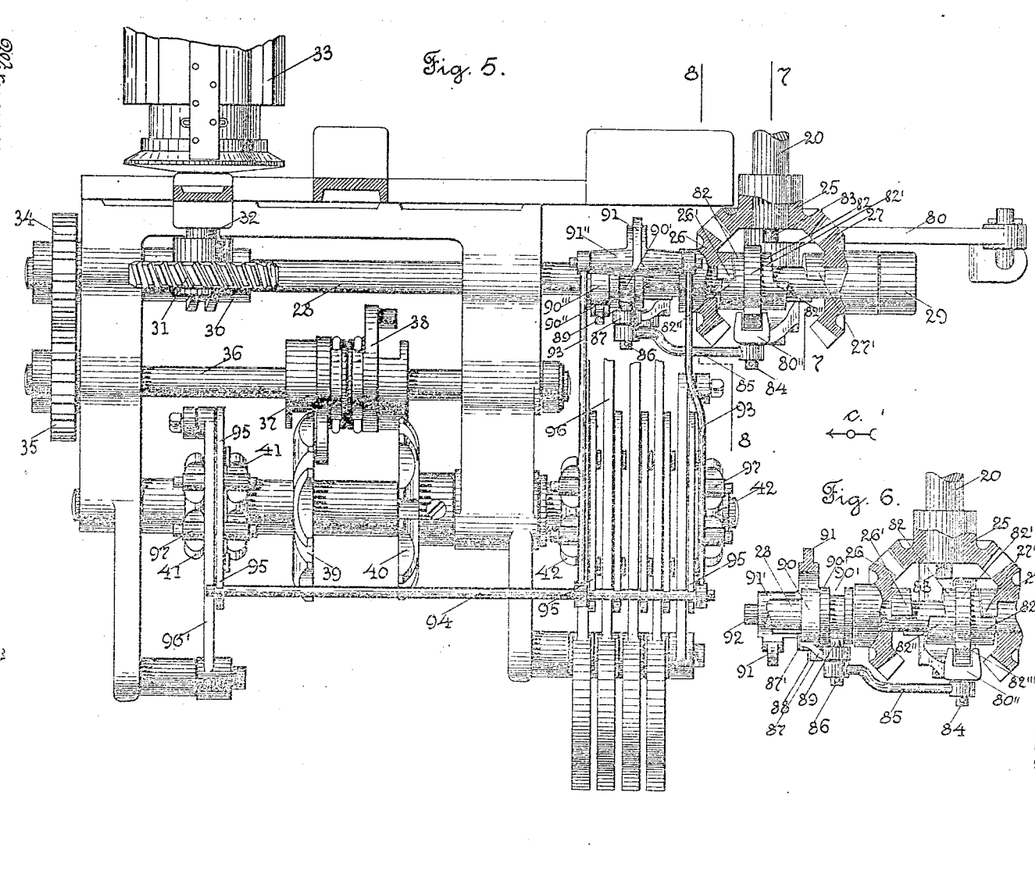
Fig. 5 is a plan view of a box pattern chain and multiplier mechanism of well known construction, not shown in the other drawings, and a part of the dobby mechanism, and also shows a sectional plan view of the clutch mechanism.
Fig. 6 shows the clutch mechanism shown in Fig. 5, in an opposite position.

In Fig. 5 is shown in addition to the dobby pattern chain mechanism shown in Figs. 3 and 4 a box pattern chain mechanism and a multiplier mechanism, of ordinary construction and operation, and similar to the pattern mechanisms combined with the dobby pattern chain mechanism, shown and described in U. S. Letters Patent, No. 617,290. A gear 34 on the end of the extended shaft 28, meshes with and operates a gear 35 on the end of a shaft 36, which carries two pin wheels 37 and 38, which are adapted to be moved into engagement with and operate two star wheels 39 and 40, one connected with the multiplier pattern chain cylinder 41, and the other with the box pattern chain cylinder 42, all in the usual and well known way.

All of the above mentioned parts may be of the usual and well known construction in the class of looms referred to.

I will now describe my improvements.

Figure 2:
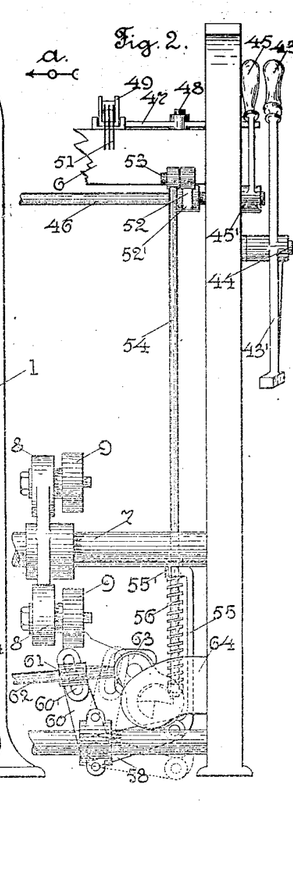
Fig. 2 is an end view of some of the parts shown in Fig. 1, looking in the direction of arrow $a$, same figure. The lay-sword, lay, crank connector, and crank shaft are not shown in this figure.

Alongside of the regular shipper handle 43, pivotally mounted on a stud 44, and having a downward extension 43' thereon, adapted to engage the shipper lever, not shown, to stop the loom, in the ordinary way, is my auxiliary handle 45, having a hub 45', see Fig. 2, fast on the end of a rock shaft 46 which extends across the loom under the breast-beam, and in this instance at the rear thereof, and is mounted in suitable bearings to have a rocking motion.

Figure 1:
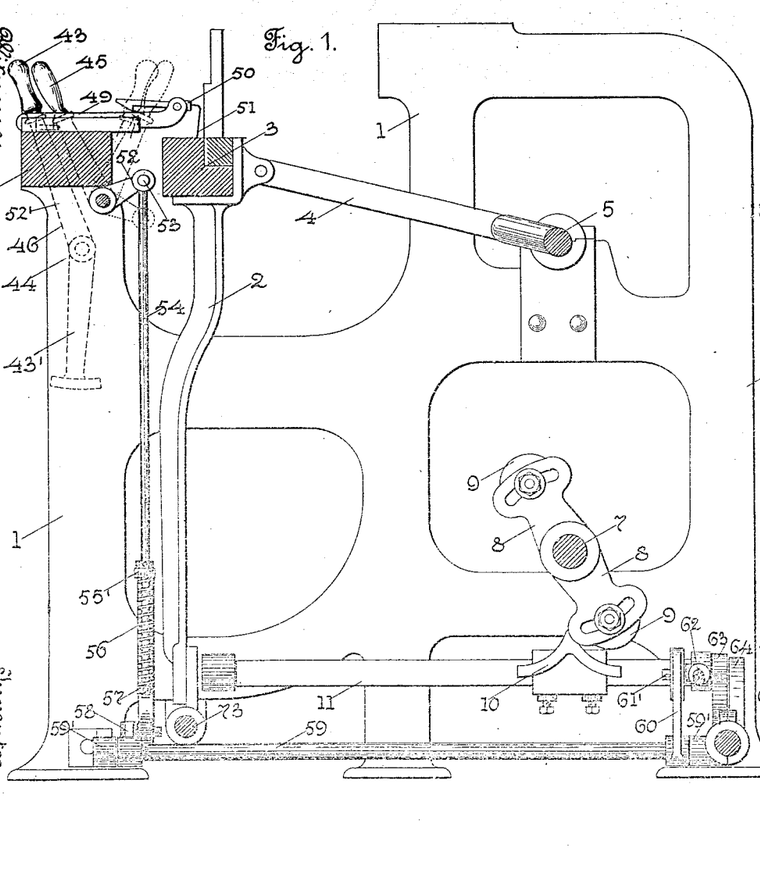
—Figure 1 is a cross section, through parts of a loom, showing the loom side on the left hand end of the loom, with the regular shipper handle, and my auxiliary shipper handle, and mechanism connected therewith, and also showing the pick mechanism.

In the path of movement of the auxiliary handle 45 extends a knock-off lever 47, pivotally mounted on a stud 48 on the breast-beam, see Fig. 2, and connected with a slide 49 carrying the filling fork 50 having the filling feelers 51 thereon, see Fig. 1, for detecting the breaking or absence of filling, in the usual and well known way.

Fast on the rock shaft 46, just inside of the loom frame, is the hub 52' of a lever 52, carrying a pin 53, on which is pivotally mounted the upper end of a connector 54, see Fig. 2. The lower end of the connector 54 extends through a boss 55' on the upper end of a link 55, and is yieldingly connnected to said boss 55' by a spring 56 encircling the lower end of the connector 54, and extending between a collar 57, on the lower end of said connector and the boss 55', see Fig. 1. The lower end of the link 55 is pivotally attached to the lever 58, see Figs. 1 and 2, which is fast on a rocking shaft 59 mounted in suitable bearings 59'. The opposite end of said shaft 59 has fast thereon a lever 60, see Figs. 1 and 2, which has a slot 60' therein, into which extends a pin 61' on a collar 61 fast on a rod 62, which rod is pivotally connected at each end with a plate 63, see Figs. 2, 3, and 4, which has a pivotal bearing in a stand 64 secured to the loom frame, and has secured thereto the rear end of the picking shaft 11, carrying the picking shoe 10, see Figs. 2 and 3, to move both picking shafts, and cause the picking shoes thereon to move out of the path of the picking balls 9, as shown by broken lines in Fig. 4, in the usual and well known way. On the opposite end of the shaft 46, and at the opposite end of the loom, see Fig. 3, is fast the upper end of a lever 65, which lever carries a pin 66 extending into the slot 67' in the upper end of a lever 67, pivoted on a pin 68, and having a shield extension 67" thereon, which is adapted to extend under the side projection 69' on the engaging end of the pawl 69, which operates the ratchet wheel 70 of the take-up mechanism, being held in yielding engagement therewith by a spring 71, and operated through an arm 72 fast on a rock shaft 73, in the usual way.

The end of the lever 65 is connected, through a connector 74, with one arm of an angle lever 75, pivoted on a stud 76 on the loom frame, see Fig. 3. The other arm of the angle lever 75 is pivotally connected with a vertically moving bar 77, which has two bosses 77' thereon, through which loosely extends a rod 78, which is connected with said bosses, in this instance through two springs 79 encircling the rod 78 and having a bearing between the bosses 77', and a collar 78' fast on said rod 78, see Fig. 4.

The upper end of the rod 78 is pivotally connected with one arm of an angle lever 80, see Fig. 4, having a hub 80', see Fig. 3, pivotally mounted on a stud 81, secured to the loom frame. The other arm of the angle lever 80 has a yoke-shaped or forked end 80" thereon, see Fig. 6, which receives an annular ridge 82' on the clutch collar 82, splined to slide on and turn with the shaft 28, see Fig. 4. The collar 82 has projections 82" on its opposite sides, which are preferably inclined or cam shaped, and are adapted to be moved into engagement with projections 26' and 27', also preferably inclined, on the hubs of the bevel gears 26 and 27, to clutch one or the other of said gears to the shaft 28, see Fig. 5, to cause said shaft to turn in a forward or backward direction, in the usual and well known way. By means of the incline or cam shape of the clutching surfaces, the clutch 82 will be forced away from one gear into clutch with the other, and vice versa.

It will be seen, that the movement of the auxiliary or operating handle or lever 45 to rock the shaft 46, will, through lever 65 and lever 67, move the pawl 69 out of engagement with the ratchet wheel 70 of the takeup mechanism, and will also, through connector 74, angle lever 75, bar 77, rod 78, angle lever 80, and clutch collar 82, cause the shaft 28 to rotate in a reverse direction, and reverse the movement of the pattern chain mechanism, Figs. 3 and 4.

Figure 7:
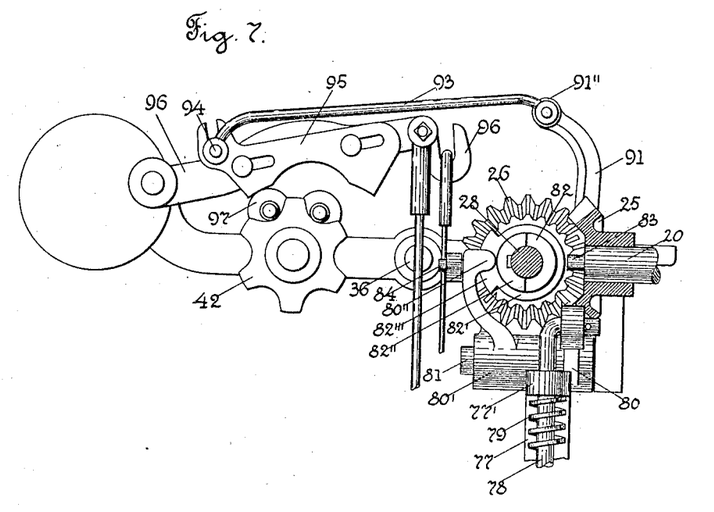
Fig. 7 is a section, on line 7, 7, Fig. 5, looking in the direction of arrow $c$, same figure.

On the clutch collar 82, I preferably provide, on the annular ridge 82', at one point, an extension 82''', see Fig. 7. Said extension 82''' will extend on one side or the other of a pin 83 on the shaft 20, see Fig. 5, and prevent the clutch from moving endwise on the shaft 28 and changing from one gear to the other, as 26 to 27, or vice versa, at the wrong time, in case the auxiliary handle 45 is pulled on at the wrong time, thus preventing a mispick.

Figure 8:
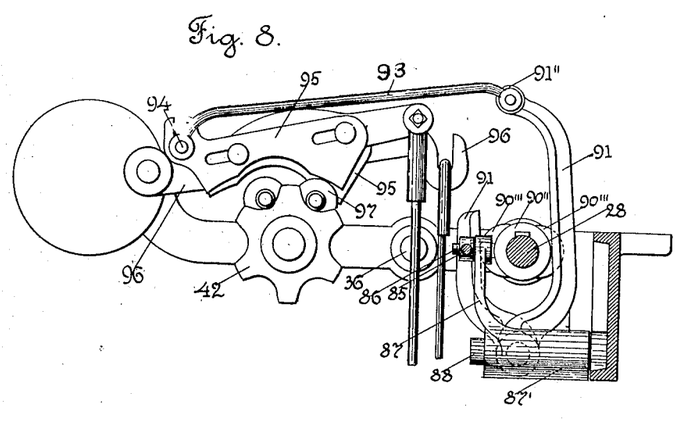
Fig. 8 is a section, on line 8, 8, Fig. 5, looking in the direction of arrow $c$, same figure.

In case my improvements are used in connection with a box pattern chain and a multiplier mechanism in addition to the dobby mechanism, the forked end of the angle lever 80 will have a pin 84 thereon, not shown in Fig. 4, which is pivotally connected, through a link 85, with a pin 86, see Fig. 6, on a lever 87, having a hub 87' pivotally mounted on a stud 88 secured to the frame, see Fig. 8. The lever 87 carries a pin 89, which extends into an annular recess 90' in the hub 90'' of a cam 90, splined on the shaft 28, see Fig. 6. The cam 90 has oppositely extending cam surfaces 90''' thereon, see Fig. 8, which extend between, and are adapted to be moved into engagement with one or the other arm of two cam arms 91, see Fig. 8, having a hub 91' pivotally mounted on a stud 92, see Fig. 6.

A cross-head 91'' on the upper end of the longer cam lever 91, see Fig. 5, has pivotally attached thereto one end of two links 93. The opposite ends of the links 93 carry a rod 94, which extends into recesses in the sliding runs 95 on the indicator levers 96, which extend over the pattern rolls or surfaces 97 on the box pattern chain cylinder 42, and the multiplier pattern chain cylinder 41, see Figs. 7 and 8. Through the movement of the cam levers 91, links 93, carrying the rod 94, and the runs 95, a proper indication of the pattern chain is obtained, while finding the pick, or after starting the loom again.

When the loom is running normally, the runs 95 on the indicator levers 96 will be in the position shown in Fig. 7, the pattern cylinder 42 rotating in a direction from right to left. When the pattern chain mechanisms are reversed, the sliding runs 95 will be moved into the position shown in Fig. 8, and the pattern cylinder 42 will be rotated in an opposite direction, or from left to right, and the first movement of the pattern cylinder 42 in a reverse direction, will through the position of the runs 95, operate the indicator levers on which said runs are mounted, so that there will always be a proper indication of the pattern chain without any loss of a pick, as will be well understood by those skilled in the art. The sliding runs 95 are applied to each box indicator lever 96, and also to the indicator lever 96' of the multiplier pattern chain, shown at the left in Fig. 5.

Figure 9:
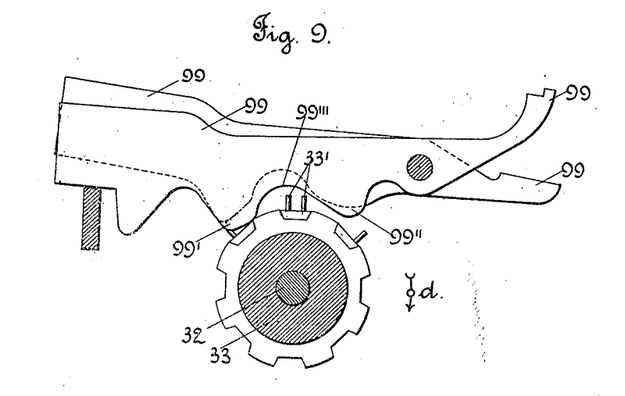
Fig. 9 shows my special dobby indicator levers or fingers, and a sectional part of the dobby pattern cylinder, showing the position of the dobby fingers when the cylinder is moving forward, in the direction indicated by arrow $d$.
Figure 10:
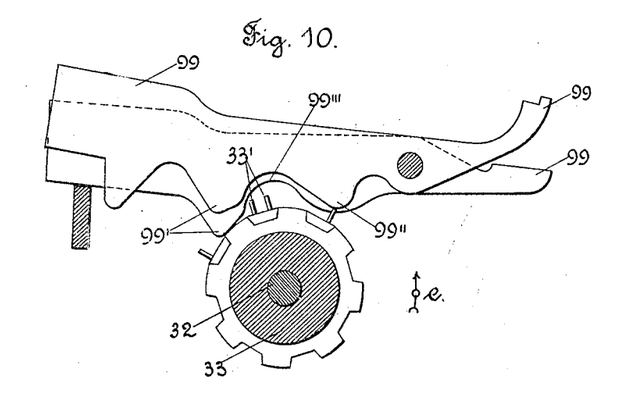
Fig. 10 corresponds to Fig. 9, but shows the position of the dobby fingers when the cylinder is moving backward, in the direction indicated by arrow $e$.

In order to have the proper indication of the harnesses, by the dobby fingers or levers 99, which extend over the dobby pattern chain cylinder 33, shown in Figs. 9 and 10, having a single index pattern chain thereon with some bars having two sets of pins, for a two weave effect said fingers or levers 99 are made with specially shaped runs thereon, each finger or lever 99 having two runs 99', and 99'' thereon, and a recessed portion 99''' intermediate said runs, so that at the forward movement of the pattern chain cylinder 33, with a double index pattern chain thereon in the direction of arrow d, Fig. 9, the harness call will be operated at a point 99' of the dobby finger. While in the reverse motion of the pattern cylinder 33, in the direction of arrow e, Fig. 10, the harness call will be operated at a point 99''. The pattern pins 33', intermediate the two points 99' and 99'', will not touch the dobby fingers or levers 99, said fingers being recessed at their middle parts at 99''', as shown.

The form and relative location of the engaging points 99' and 99'', and the time of movement of the knives or lifter blades, not shown, of the dobby mechanism, is such, that in the revolution of the dobby pattern chain cylinder 33 in a forward direction, as indicated by arrow d Fig. 9, a pattern pin 33', at the right, will first engage the projection 99'' on a lever 99 nearest the pivotal support of said lever, and will raise the lever, and then pass out from under the projection, while the contiguous pattern pins 33', at the center in Fig. 9, will pass into the recessed portion of the lever, and the next pattern pin 33', at the left, will pass under and engage the projection 99' farthest from the pivotal support of the lever, and will raise said lever at its inner end, as shown in the case of the second lever in Fig. 9, to call for the harness desired. The raising of the lever 99 by the first pattern pin 33' passing under the projection 99'' on said lever is so timed, that it will not cause any operation of the mechanism to call a harness, for the reason that the knives or lifter blades are not at that time in a position to engage and operate the hooks on the jacks. On the reverse movement of the pattern chain cylinder 33, in the direction of arrow e, Fig. 10, a pattern pin 33' at the left, will first engage a projection 99' on a lever 99 farthest from the pivotal support of said lever, and will raise the lever, and then pass out from under the projection, while the contiguous pattern pins 33', at the center in Fig. 10, will pass into the recessed portion of the lever, and the next pattern pin 33' at the right, will pass under and engage the projection 99'' nearest the pivotal support of the lever, and will raise said lever at its inner end, as shown in the case of the first lever in Fig. 9, to call for the harness desired. The raising of the lever 99, by the first pattern pin 33', at the left in Fig. 10, passing under the projection 99' on said lever 99, is so timed, that it will not cause any operation of the mechanism to call a harness, for the reason that the knives or lifter blades are not at that time in a position to engage and operate the hooks on the jacks.

From the above description in connection with the drawings, the operation of my improvements will be readily understood by those skilled in the art.

It will be understood that the details of construction of my improvements may be varied if desired.

Having thus described my invention, what I claim as new and desire to secure by Letters Patent is:—

1. In a loom, the combination with pick mechanism, pattern chain driving mechanism, and take-up mechanism, of an operating handle or lever, and connections intermediate said handle or lever and the pick mechanism, and intermediate said handle or lever and the pattern chain driving mechanism, and intermediate said handle or lever and the take-up mechanism, the movement of said handle or lever acting to throw out of operation the pick mechanism, to reverse the pattern chain driving mechanism, and to throw out of operation the take-up mechanism.

2. In a loom, the combination with pick mechanism, pattern chain driving mechanism, box pattern chain mechanism, and take-up mechanism, of an operating handle or lever, and connections intermediate said handle or lever and the pick mechanism, to move the picking shoes out of engagement with the picking rolls, and connections intermediate said handle or lever and the pattern chain driving mechanism and the box pattern and dobby chain mechanisms, to move the sliding clutch of the pattern chain driving mechanism, to reverse the box pattern and dobby chain mechanisms, and to move a cam to move the runs on the indicator levers of the box pattern chain and of the multiplier pattern chain and said cam, and connections intermediate said handle or lever and the take-up mechanism, to lift the pawl of the ratchet of the take-up mechanism.

3. In a loom, the combination with pick mechanism, pattern chain driving mechanism, the box pattern chain and the multiplier pattern chain, and indicator levers for said chains provided with sliding runs, and the take-up mechanism, of an operating handle or lever, and connections intermediate said handle or lever and the pick mechanism, to move the pick shoes out of engagement with the picking rolls, and connections intermediate said handle or lever and the pattern chain driving mechanism, to move the sliding clutch of the pattern chain driving mechanism to reverse the box pattern chain and the multiplier pattern chain mechanisms, and to move a cam to move the runs on the indicator levers of the box pattern chain and said cam and of the multiplier pattern chain, and connections intermediate said handle or lever and the take-up mechanism, to lift the pawl of the ratchet of the take-up mechanism.

4. In a loom, the combination with pick mechanism, pattern chain driving mechanism, and take-up mechanism, of an operating handle or lever, and connections intermediate said handle or lever and the pick mechanism, to throw out of operation the pick mechanism, said connections having therein a spring, and connections intermediate said handle or lever and the pattern chain driving mechanism, to reverse the pattern chain driving mechanism, and connections intermediate said handle or lever and the take-up mechanism, to throw out of operation the take-up mechanism.

5. In a loom, the combination with pick mechanism, pattern chain driving mechanism, and take-up mechanism, of an operating handle or lever, and connections intermediate said handle or lever and the pick mechanism, to throw out of operation the pick mechanism, said connections having therein a spring, and connections intermediate said handle or lever and the pattern chain driving mechanism, to reverse the pattern chain driving mechanism, said connections having therein a spring, and connections intermediate said handle or lever and take-up mechanism, to throw out of operation the take-up mechanism.

6. In a loom, the combination with the clutch driving mechanism of the dobby pattern chain mechanism, of an operating handle or lever, and connections intermediate said handle or lever and the clutch driving mechanism, to operate said clutch mechanism to reverse the pattern chain of the dobby, and indicator fingers for the dobby chain, having runs thereon to indicate for the proper calling of the harnesses, in the forward reverse movement of the pattern chain cylinder.

7. In a loom, a reverse clutch mechanism for the pattern chain mechanism, comprising a clutch collar splined and slidable on a driven shaft, and having an annular ridge thereon, and an extension on said ridge adapted to extend on one side or the other of a stationary pin, to prevent the clutch from endwise movement, and said pin 8. In a loom, the combination with a dobby pattern chain cylinder, and a pattern chain thereon, of indicator fingers or levers for said chain, each finger or lever having two runs or engaging points thereon for the pattern pins, both on one side of the pivot of said finger or lever, and a recessed portion intermediate said runs, to indicate the proper calling of the harnesses, on the forward or reverse movement of the pattern cylinder.

9. In a loom, the combination with a dobby pattern chain cylinder, and a single index pattern chain thereon, of indicator fingers or levers for said chain, each finger or lever having two runs or engaging surfaces thereon for the pattern pins, both on one side of the pivot of the finger or lever, and said runs in alinement with each other and in the same vertical plane, and a recessed portion intermediate said runs, to indicate the proper calling of the harnesses, on the forward or reverse movement of the pattern cylinder.

10. In a loom, the combination with a dobby pattern chain cylinder, and a pattern chain thereon, of indicator fingers or levers for said chain, each finger or lever having two runs or engaging surfaces thereon for the pattern pins, both on one side of the pivot of the finger or lever, and said runs or engaging surfaces in alinement and in the same vertical plane, and a recessed portion intermediate said runs.

B. F. McGUINESS.

Witnesses:
J. C. DEWEY,
M. HAAS.